United States Patent [19]

Shimoda

[11] Patent Number: 4,934,751
[45] Date of Patent: Jun. 19, 1990

[54] AUTOMOTIVE BODY SIDE WALL STRUCTURE

[75] Inventor: Nobuyoshi Shimoda, Tokyo, Japan

[73] Assignee: Honda Giken Kogyo Kabushiki Kaishi, Tokyo, Japan

[21] Appl. No.: 290,324

[22] Filed: Dec. 27, 1988

[30] Foreign Application Priority Data

Dec. 28, 1987 [JP] Japan .......................... 62-201410[U]

[51] Int. Cl.⁵ ............................................. B62D 25/02
[52] U.S. Cl. .................................. 296/188; 276/195; 276/203
[58] Field of Search ............... 296/188, 189, 146, 202, 296/195, 203; 49/502, 503

[56] References Cited

U.S. PATENT DOCUMENTS

| | | | |
|---|---|---|---|
| 2,662,793 | 12/1953 | Lindsay | 296/195 |
| 3,907,358 | 9/1975 | Barenyi et al. | 296/146 |
| 4,234,225 | 11/1980 | Harasaki et al. | 296/188 X |
| 4,328,642 | 5/1982 | Presto | 49/502 |
| 4,747,636 | 5/1988 | Harasaki et al. | 296/203 X |

FOREIGN PATENT DOCUMENTS 2258280 9/1975 France .................................. 49/502

*Primary Examiner*—Dennis H. Pedder
*Attorney, Agent, or Firm*—Armstrong, Nikaido, Marmelstein, Kubovcik & Murray

[57] ABSTRACT

A side wall structure in an automotive body is designed for increased mechanical strength against shocks which will be applied laterally to the automotive body. The side wall structure includes an inner panel and an outer panel which are spaced laterally from each other and define a space therebetween, a first reinforcing member disposed in the space near the outer panel and extending in a longitudinal direction of the automobile body, a second reinforcing member having one end facing an inner surface of the first reinforcing member, the second reinforcing member being disposed between the inner panel and the first reinforcing member, and a third reinforcing beam having an end disposed in confronting relation to the other end of the second reinforcing member, the third reinforcing member exending across the passenger compartment of the automotive body.

7 Claims, 2 Drawing Sheets

AUTOMOTIVE BODY SIDE WALL STRUCTURE

BACKGROUND OF THE INVENTION

1. Field of the Invention:

The present invention relates to a side wall structure for use in an automotive body, and more particularly to an automotive body side structure near a rear seat in an automobile.

2. Description of the Relevant Art:

It is preferable that the side walls of an automotive body be mechanically strong enough to protect passengers from the danger of injuries when shocks are applied laterally to the automotive body. In order to provide safety for passengers on the rear seats as well as passengers on the front seats, it is necessary to increase the mechanical strength of the side walls of the automotive body near the rear seats.

SUMMARY OF THE INVENTION

According to the present invention, there is provided a side wall structure in an automotive body having a passenger compartment, comprising an inner panel and an outer panel which are spaced laterally from each other and define a space therebetween, a first reinforcing member disposed in the space near the outer panel and extending in a longitudinal direction of the automobile body, a second reinforcing member having one end facing an inner surface of the first reinforcing member, the second reinforcing member being disposed between the inner panel and the first reinforcing member, and a third reinforcing beam having an end disposed in confronting relation to the other end of the second reinforcing member, the third reinforcing member extending across the passenger compartment.

When a load is applied laterally to a body side wall near a rear seat in the automotive body, the load is first borne by the first reinforcing member and then transmitted and distributed from the first reinforcing member via the second reinforcing member to the third reinforcing member which is highly rigid. The third reinforcing member is disposed in the dead space beneath the rear seat.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
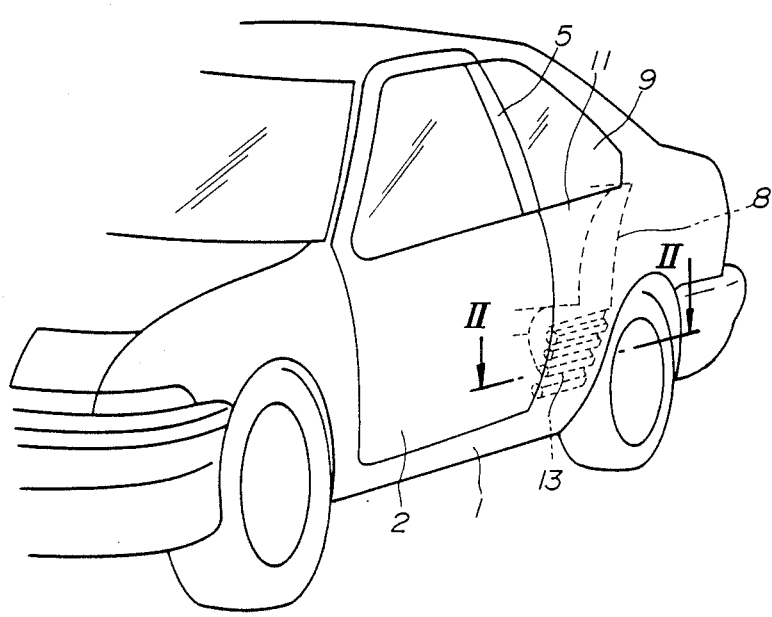
FIG. 1 is a fragmentary schematic perspective view of a two-door automobile in which the principles of the present invention are incorporated.
Figure 2:
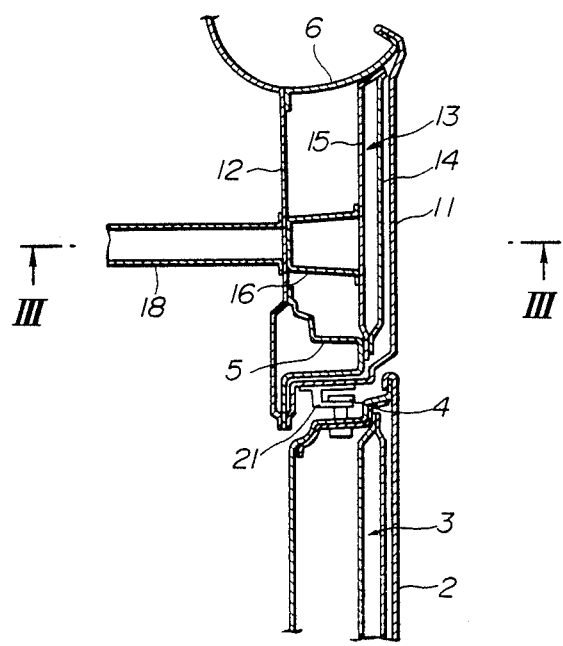
FIG. 2 is a cross-sectional view taken along line II—II of FIG. 1.
Figure 3:
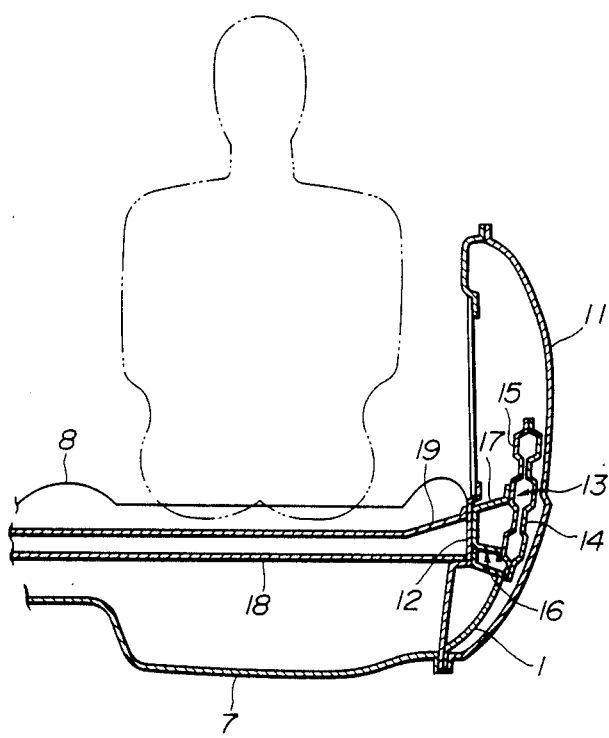
FIG. 3 is a cross-sectional view taken along line III—III of FIG. 2.

As shown in FIGS. 1, 2, and 3, a side wall structure of the automotive body of a two-door automobile includes an outer panel 11 and an inner panel 12 which are disposed laterally of a rear seat 8, i.e., in a body side beneath a rear quarter window 9. As shown in FIG. 2, front and rear lower portions of the outer and inner panels 11, 12 are joined respectively to a central pillar 5 and a rear wheel house 6.

A reinforcing beam or a first reinforcing member 13 is disposed in a lower portion of a space defined between the outer and inner panels 11, 12 in the vicinity of the outer panel 11. The reinforcing beam 13 is of a closed hollow configuration comprising two corrugated plates 14, 15 that are coupled to each other. As illustrated in FIG. 2. The reinforcing beam 13 extends in the longitudinal direction of the automobile and has front and rear ends fixed respectively to the central pillar 5 and the rear wheel house 6 by welding, and a lower end coupled to a side sill 1 (FIGS. 2 and 3).

A panel spacer or a second reinforcing member 16 in the form of a hollow box having one open end is disposed between the inner panel 12 and the reinforcing beam 13. The open end of the panel spacer 16 is welded to a lower portion of the surface of the reinforcing beam 13 which faces the passenger compartment of the automobile. The end of the panel spacer 16 which is opposite to the open end is held against and attached to the inner panel 12. The panel spacer 16 has an upper surface 17 slanted downwardly toward the passenger compartment, as shown in FIG. 3.

A rear lateral beam or a third reinforcing member 18 has a closed hollow cross section and is vertically disposed between a rear floor 7 and the rear seat 8, the rear lateral beam 18 extending in the transverse direction of the automotive body and through the passenger compartment of the automobile. As shown in FIGS. 2 and 3, each of the opposite ends of the rear lateral beam 18 confronts the panel spacer 16 across the inner panel 12 and is fixed to the inner surface of the inner panel 12 by welding. The rear lateral beam 18 is located in the dead space below the rear seat 8.

As shown in FIG. 3, each end of the rear lateral beam 18 has an upper surface 19 slanted downwardly into the automotive body so as lie substantially in line with the slanted upper surface 17 of the panel spacer 16. Since the upper surface of the intermediate portion of the rear lateral beam 18 is in a low position, the rear seat 8 may be of a relatively large thickness for increased riding comfort. The area of the panel spacer 16 which bears a load imposed by the reinforcing beam 13 is large, and buckling forces to be applied to the rear lateral beam 18 are rendered uniform. The load applied laterally from the inner panel 12 can easily be transmitted to the rear lateral beam 18 since the load is directed obliquely downwardly.

As shown in FIG. 2, a reinforcing beam 3 and an antiburst hook 4 which are disposed in a door 2 are positioned in substantially the same height as that of the reinforcing beam 13, so that any load produced when the reinforcing beam 13 is recessed or deformed inwardly can effectively be transmitted to the reinforcing beam 3 in the door 2 through a door latch 21 and the antiburst hook 4 for load distribution.

The reinforcing beam 13, the panel spacer 16, and the rear lateral beam 18 are disposed in substantially the same height as that of the bumpers of the automobile.

When a load is applied laterally to the automobile body side wall between the central pillar 5 and the rear wheel house 6, the load is first borne by the reinforcing beam 13, and then effectively transmitted from the reinforcing beam 13 via the panel spacer 16 to the rear lateral beam 18 which is sufficiently rigid. Therefore, the inner panel 12 is prevented from being forced into the passenger compartment by the load thus applied laterally.

While the two-door automobile has been described above in the illustrated embodiment, the present invention is equally applicable to a four-door automobile and automobiles of other types.

With the present invention, as described above, the mechanical strength of the side wall structure of the automotive body, particularly in the vicinity of the rear seat, is greatly increased to safely protect passengers against shocks imposed laterally to the lower portion of the side wall structure of the automotive body.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. A side wall structure in an automotive body including a passenger compartment, a central pillar and a rear wheel house, comprising:

an outer panel defining an outline of said automotive body and interconnecting said rear wheel house and said central pillar;

an inner panel disposed inside of and laterally spaced from said outer panel and interconnecting the rear wheel house and the central pillar;

a first reinforcing member disposed between said outer panel and said inner panel in the vicinity of said outer panel and interconnecting the rear wheel house and the central pillar, said inner panel and said first reinforcing member forming a certain space therebetween;

a second reinforcing member disposed in said certain space and having one end facing an inner surface of said first reinforcing member and the other end facing an outer surface of said inner panel; and a third reinforcing member having an end disposed in confronting relation to said other end of said second reinforcing member, said third reinforcing member extending in a transverse direction of the automotive body across the passenger compartment.

2. A side wall structure according to claim 1, wherein said automotive body further includes a side sill and said first reinforcing member has a lower end attached to said side sill.

3. A side wall structure according to claim 1, wherein said second reinforcing member has an upper surface slanted downwardly into said automotive body.

4. A side wall structure according to claim 1, wherein said end of the third reinforcing member has an upper surface slanted downwardly into said automotive body.

5. A side wall structure according to claim 4, wherein said upper surface of said second reinforcing member and said upper surface of said third reinforcing member are substantially in line with each other.

6. A side wall structure according to claim 1, wherein said automotive body includes a rear seat, and said third reinforcing member is disposed beneath said rear seat.

7. A side wall structure according to claim 1, wherein said automotive body further includes a door latch and a hook engageable with said door latch and disposed at substantially the same height as the height of said first reinforcing member.

* * * * *